United States Patent [19]

Manschwetus

[11] Patent Number: 5,056,394
[45] Date of Patent: Oct. 15, 1991

[54] BLADE HOLDING DEVICE OF A BLADE SLIDE FOR A SCRAP CUTTER

[75] Inventor: Helmut Manschwetus, Fuldabruck, Fed. Rep. of Germany

[73] Assignee: Thyssen Industrie AG, Essen, Fed. Rep. of Germany

[21] Appl. No.: 624,347

[22] Filed: Dec. 7, 1990

[30] Foreign Application Priority Data

Dec. 9, 1989 [DE] Fed. Rep. of Germany ....... 3940717

[51] Int. Cl.$^5$ .............................................. B26D 1/08
[52] U.S. Cl. ...................................... 83/694; 83/636; 83/698; 403/16
[58] Field of Search ................. 83/698, 694, 699, 636; 407/48, 103; 403/11, 16, 260

[56] References Cited

U.S. PATENT DOCUMENTS 3,046,825  7/1962  Thompson ............................ 83/698
4,607,971  8/1986  Hartmann et al. ...................... 403/2

OTHER PUBLICATIONS

Thyssen Henschel: Henschel Schrottaufbereitungsanlagen; Report 2/87; Maschinen, Anlagen und Verfahren für die Schrottaufbereitung (no translation).

Primary Examiner—Frank T. Yost
Assistant Examiner—John M. Husar
Attorney, Agent, or Firm—Robert W. Becker & Associates

[57] ABSTRACT

In blade holding devices sleeves are arranged concentrically about the blade securing screws, in order to relieve the blade securing screws from lateral shearing force components and vertically acting stripping forces resulting, when the blade slide is moved upward, from the friction between the blade and the scrap metal in the feed channel. For the removal of the blade, lateral wearing plates in the feed channel have to be removed. In order to permit the removal of the blade from the holding device without dismantling the wearing plates of the feed channel and, at the same time, retaining the sleeves, a short sleeve is provided, that, in an operational position of said scrap cutter, ascertains form-locking between the blade and the blade slide or the blade support and rests against a long spacing sleeve that is concentrically arranged about a shaft of the blade securing screw and is held by the blade securing nut. The short sleeve is also concentrically arranged about the shaft of the blade securing screw. After removal of the blade securing screws, the short sleeve may be slid toward the backside of the blade, permitting the removal of the blade in a downward direction. A dismantling of the lateral wearing plates is unnecessary.

7 Claims, 5 Drawing Sheets

BLADE HOLDING DEVICE OF A BLADE SLIDE FOR A SCRAP CUTTER

BACKGROUND OF THE INVENTION

The present invention relates to a blade holding device of a blade slide for a scrap cutter in which a slanted blade is fastened in a cutout of a blade slide with blade securing screws and blade securing nuts, and is secured against sliding in a vertical rearward blade contact surface of the blade slide in a form-locking manner with sleeves that are concentrically arranged about a shaft of the blade securing screws.

A blade holding device in which the blade is exchangeably arranged in a chuck made of hardened steel and in which the blade bolt is protected against transverse loads by relief sleeves is disclosed in a publication by Thyssen (THYSSEN HENSCHEL; Henschel-Schrottaufbereitungsanlagen; Report 2/87; Maschinen, Anlagen und Verfahren für die Schrottaufbereitung).

The relief sleeves mentioned therein correspond to the sleeves referred to in the preamble of claim 1. They consist of hardened steel, they have thin walls and do not have a slot. The inner and the outer diameter of the sleeves are selected such that there is a small tolerance provided between the receiving bores of the blade or the chuck and the sleeve as well as between the outer diameter of the blade bolt and the inner bore of the sleeve. The tolerance between the receiving bores and the sleeves is determined such that the shearing forces are directly transferred from the blade to the chuck without transferral of forces to the sleeve.

In blade holding devices of the aforementioned kind, lateral shearing force components occur when the blade is slanted. Also, when the blade slide is moved upward, predominantly vertically acting stripping forces result from the friction between the blade and the scrap metal present in the feed channel. The sleeves arranged concentrically about the screw shaft serve to relieve the blade securing screws from the above mentioned forces.

When the blade slide remains in place, the demounting and installation of the blade in a holding device of the aforementioned kind is possible only in the longitudinal direction of the sleeves which secure the form-locking, that is, in the direction of the feed channel of the scrap cutter. However, it is then necessary to dismantle the wearing plates of the feed channel, which are overlapped by the blades, in order to have enough lateral space for the removal of the blades. The dismantling and reinstallation of the wearing plates onto the walls of the feed channel, after the blade exchange is completed, is very time consuming. In addition, the removal of the blade, after the blade securing screws have been removed, usually requires significant force because the blade as well as the blade holding device surfaces in the blade slide or the blade support are deformed by the forces acting upon the device during operation.

It is therefore an object of the present invention to improve a blade holding device of the aforementioned kind such that, while retaining the sleeves for form-locking and securing the blade, the removal and reinstallation of the blades is accomplished without dismantling the wearing plates of the feed channel.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
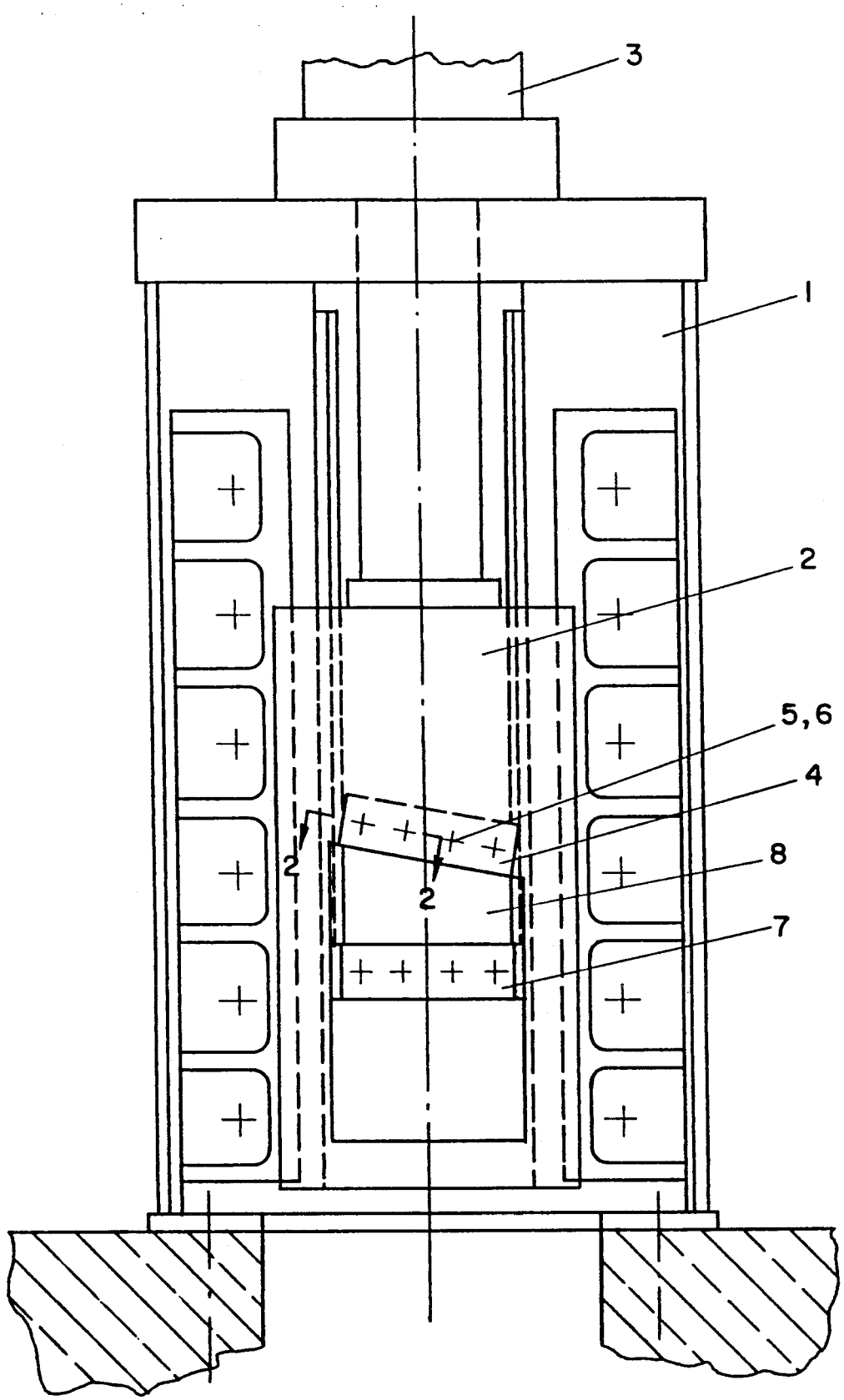
FIG. 1 is an end view of a scrap cutter with a vertically guided blade slide.

The blade holding device of the present invention is primarily characterized by a first end of the sleeve extending into a recess of a rearward abutting surface of the blade and a second end of the sleeve extending into throughbores of the blade slide. The throughbores extend from a blade contact surface of the blade slide to a second recess at a backside of the blade slide. The second recess has a contact surface on which the blade securing nut, or a washer, rests. The sleeve, during demounting of the blade, after removal of the nuts and screws in a longitudinal direction of a feed channel, is slid toward the backside of the blade slide until the first end of the sleeve is outside the recess of the rearward abutting surface of the blade so that form-locking between the blade and the blade slide is canceled.

In a further embodiment, between the blade and the blade slide, there is a blade support provided which is fastened to the blade slide and is equipped with throughholes for receiving the sleeves.

In another embodiment, the sleeve comprises a first short sleeve and a second long spacing sleeve. The short sleeve is disposed in the recess of the abutting surface of the blade and partially in the throughhole of the blade support, thereby form-locking the blade and the blade support. The second long spacing sleeve extends from the throughhole of the blade support into the throughbore of the blade slide. In an operational position of the scrap cutter, a face of the short sleeve, which face is facing the blade slide, rests against a further face of the long spacing sleeve, which further face is facing the blade.

The advantage of the blade holding device of the present invention is that, after the blade securing nuts and the blade securing screws have been removed, the sleeves which ascertain the form-locking between the blade and the blade slide or the blade support may be slid away from the blade contact surface in the direction of the back side of the blade slide. Thus, the blade may be removed in a downward direction without having to dismantle the lateral wearing plates of the feed channel.

When the sleeve comprises a first and a second sleeve, the sliding is effected by inserting a tool through the opening for the screw head and pushing the sleeve backward toward the backside of the blade slide. The advantage of having an undivided sleeve is that the sleeve may be removed without the use of tools by simply pulling its end that protrudes into the recess of the backside of the blade slide.

To further facilitate the removal of a one-piece blade in the downward direction, the blade, in a direction parallel to a shearing plane, is in the form of a trapezoid, whereby a longer one of the parallel sides of the trapezoid is facing downward. Between outward ends of the blade and cross-pieces of the blade slide, wedge-shaped pieces are disposed, which are fastened to the cross-pieces.

In another embodiment, the blade is split in a longitudinal direction having a first and a second blade section, each in the form of a trapezoid and arranged adjacent to one another, whereby a longer one of the parallel sides of the trapezoid of the first blade section that is first in a direction of shearing is facing downward and a shorter one of the parallel sides of the trapezoid of the second blade section that is second in the direction of shearing is facing downward. Between outward ends of the blade and cross-pieces of the blade slide wedge-shaped pieces are disposed, which are fastened to the cross-pieces.

DESCRIPTION OF PREFERRED EMBODIMENTS

The present invention will now be described in detail with the aid of several specific embodiments utilizing FIGS. 1 through 6.

In the scrap cutter according to FIG. 1 a blade slide 2 is guided vertically in or at a cutter stand 1 in a guide means that is not represented in detail in the drawing. The blade slide 2 is driven by a hydraulic cylinder 3.

Figure 2:
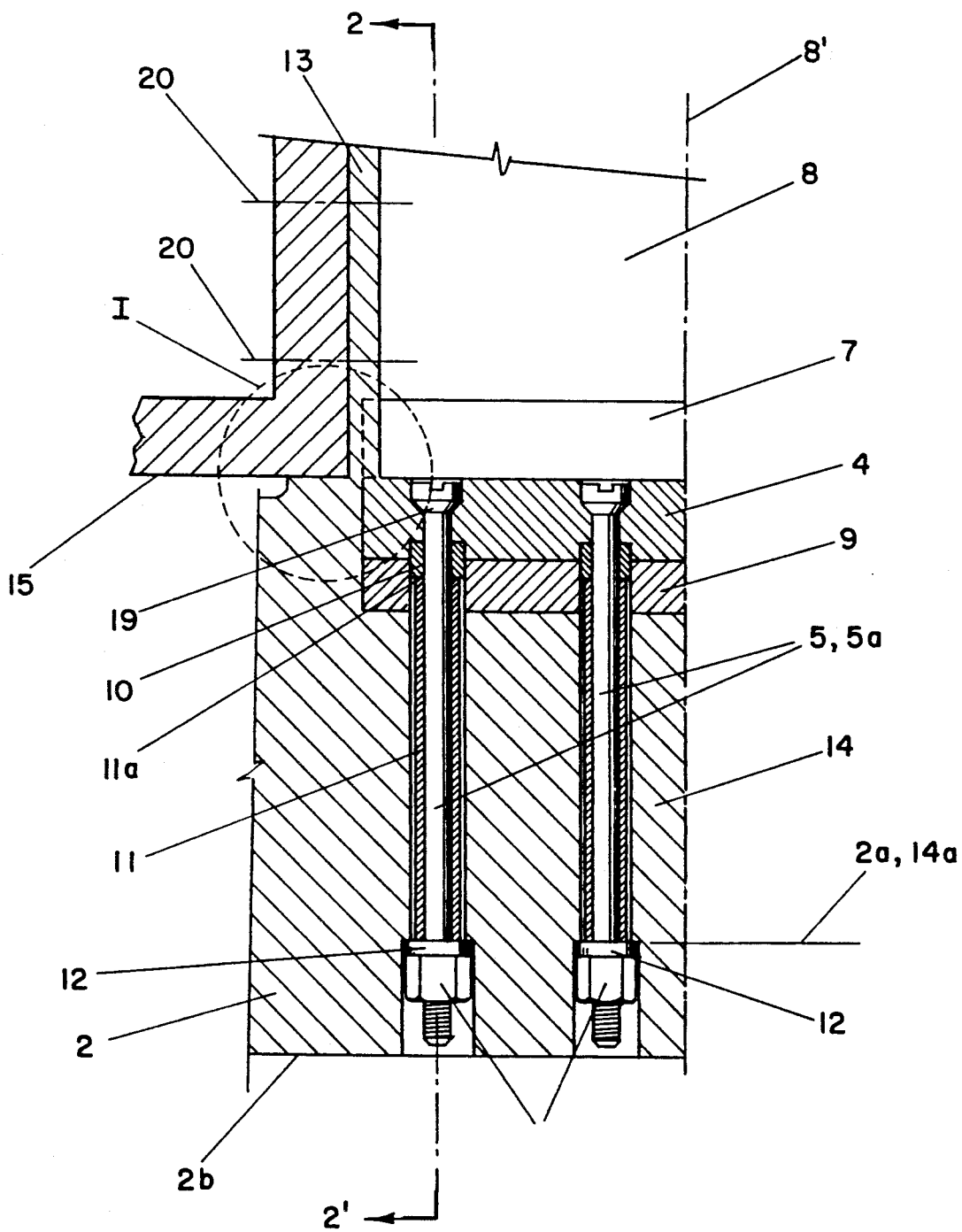
FIG. 2 shows a view of the blade holding device at the blade slide along the line 2—2' in FIG. 1.

The blade 4 is secured to the blade slide 2 by blade securing screws 5 and blade securing nuts 6 which are only schematically represented in FIG. 1, but are shown in detail in FIG. 2. The blade 4 (=upper blade) interacts with the blade 7 (=lower blade) which is attached at the bottom of the face of the feed channel 8.

Figure 3:
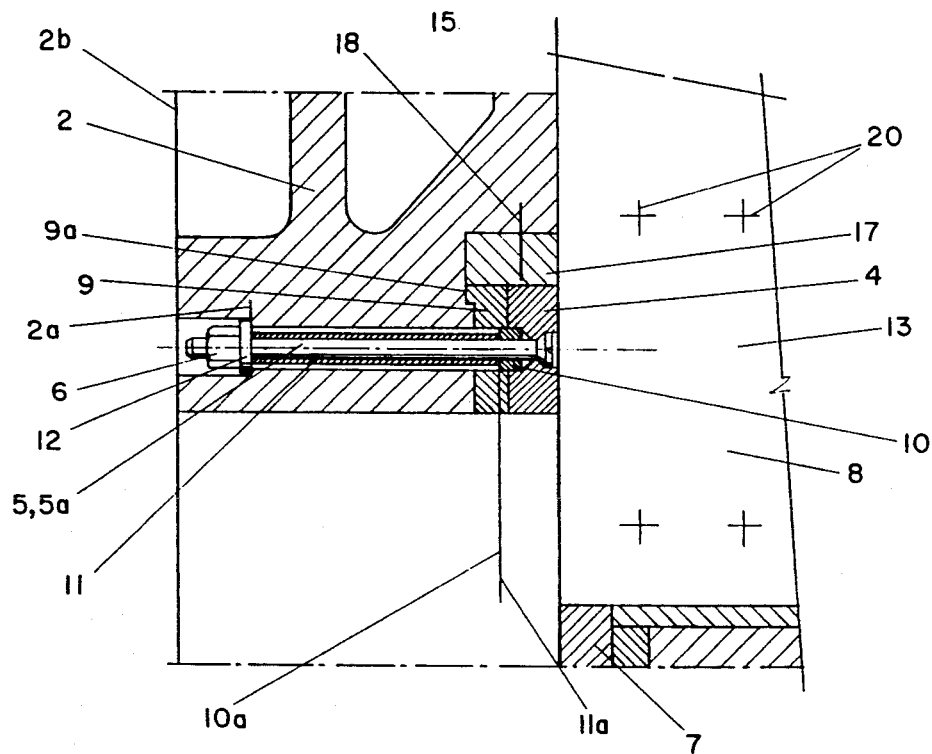
FIG. 3 shows a view of the blade holding device at the blade slide along the line 3—3' in FIG. 2.
Figure 4:
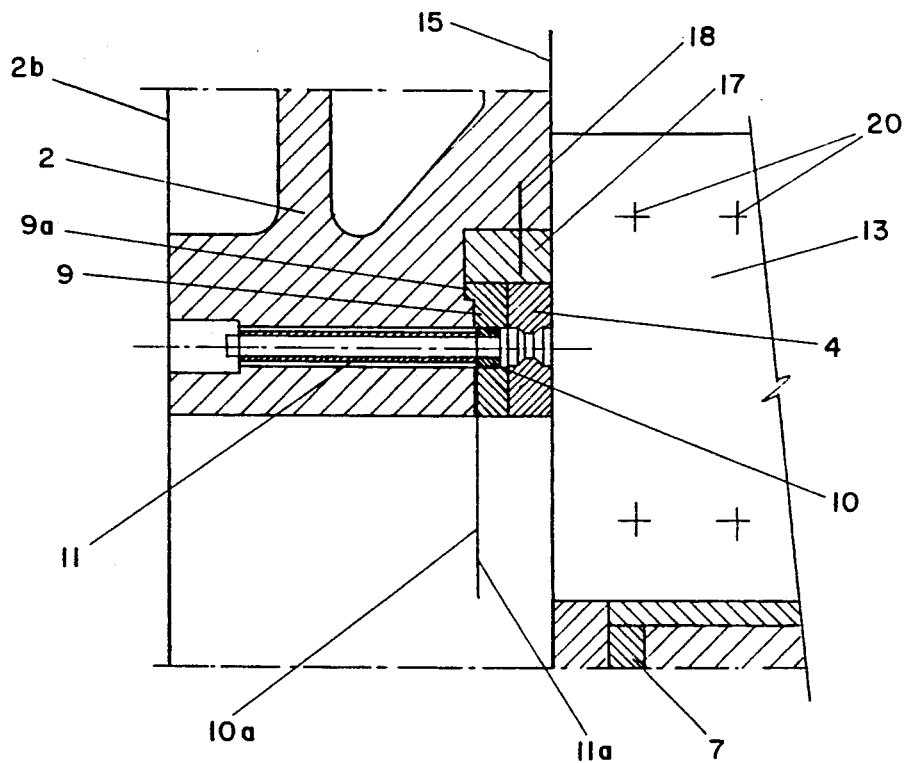
FIG. 4 is a view corresponding to FIG. 3 without the blade securing screw and with the sleeve slid back.

Details of the blade securing are shown in FIG. 2 which is an enlarged view along the line 2—2' in FIG. 1. In order to simplify FIG. 2, only a section of the blade slide 2, that is extending to the vertical longitudinal center plane 8' of the feed channel 8, is represented. The blade 4 (upper blade) that extends to the shearing plane 15 where it interacts with the blade 7 (lower blade) is secured at the blade slide 2 with a plurality of blade securing screws 5 and blade securing nuts 6 which are accessible from the back side 2b of the blade slide 2. In the embodiment represented, a blade support 9 is provided between the blade 4 and the blade slide 2. As may be seen in FIGS. 3 and 4, the rearward blade support 9 is secured against sliding downward by a projection 9a that is disposed at the upper end of the back side and engages a corresponding recess at the blade slide 2. The rearward blade support 9 and the blade 4 are supported at their upper ends by the upper blade support 17 disposed in a recess of the blade slide 2 as represented in FIGS. 3 and 4. The upper blade support 17 is secured by screws 18 to the blade slide 2.

Short sleeves 10 are arranged concentrically to the blade securing screws 5, which, in the operational position of the blade slide 2, as shown in FIGS. 2 and 3, at the same time are protruding on the one hand into the corresponding concentric recesses in the rearward abutting surface of the blade 4 and on the other hand into the concentric enlarged round throughholes 19 for the screw shaft 5a in the rearward blade support 9. The short sleeves 10 secure the form-locking between the blade 4 and the blade support 9 in the rearward abutting surface of the blade 4. The faces of the recesses in the rearward abutting surface of the blade 4, on the one hand, and the face 11a of the long spacing sleeve 11, which is facing the blade 4, with its rearward end extending to the supporting plane 2a that is facing the blade slide and onto which the washer 12 of the securing nut 6 rests, on the other hand, serve as an abutment against sliding of the short sleeves 10 in a longitudinal direction of the blade securing screws 5.

As may be seen in the dot-dashed encircled portion I in FIG. 2, the lateral ends of the blade 4 overlap the face of the wearing plates 13 of the sides of the feed channel 8. This overlap is necessary to prevent damage, such as breaking of the edges, of the blade 4. In order to demount the blade 4 in a downward direction, without removing the lateral wearing plates 13 which are fastened with screws 20, the blade securing nuts 6 and the blade securing screws 5 are removed first in the direction of the feed channel 8. The short sleeve 10 is then slid back in the direction of the back side of the blade slide 2 until form-locking between the blade 4 and the rearward blade support 9 is canceled.

FIG. 4 represents the sleeve 10 in a position in which it is slid backward. Instead of a short sleeve 10 with a long spacing sleeve 11 that is resting against it, as shown in FIG. 2 along the line 3—3', a continuous long sleeve 14 may be employed as represented on the right hand side of FIG. 2. The latter arrangement permits canceling of the form-locking between the blade 4 and the rearward blade support 9 by pulling back the long sleeve 14.

To further facilitate the demounting of the slanted one-piece blade 4 in a downward direction, the blade 4 is shaped in a trapezoidal form parallel to the shearing plane 15 (cf. FIG. 5) with the longer one of the parallel sides of the trapezoid facing downward. The lateral support for the blade 4 is provided by wedge-shaped pieces 16a, 16b which are attached to the longitudinal cross-pieces 2c of the blade slide 2 by screws that are not shown in detail.

In order to simplify the demounting process for a two-piece blade 4a, 4b (cf. FIG. 6), both blade sections 4a and 4b are formed in a trapezoidal shape parallel to the shearing plane 15. The blade section 4a which is positioned first in the direction of the shearing has a longer side 4a' of the parallel sides of the trapezoid facing downward. The adjacent blade section 4b which is positioned second in the direction of the shearing has a shorter side 4b' of the parallel sides of the trapezoid facing downward. Both blade sections 4a, 4b together form a parallelogram. The lateral support of the blade is also achieved by wedge-shaped pieces 16c, 16d which are fastened to the longitudinal cross-pieces 2c of the blade slide 2 by screws that are not shown in detail.

During the blade demounting process, the first blade section 4a is removed first.

Figure 5:
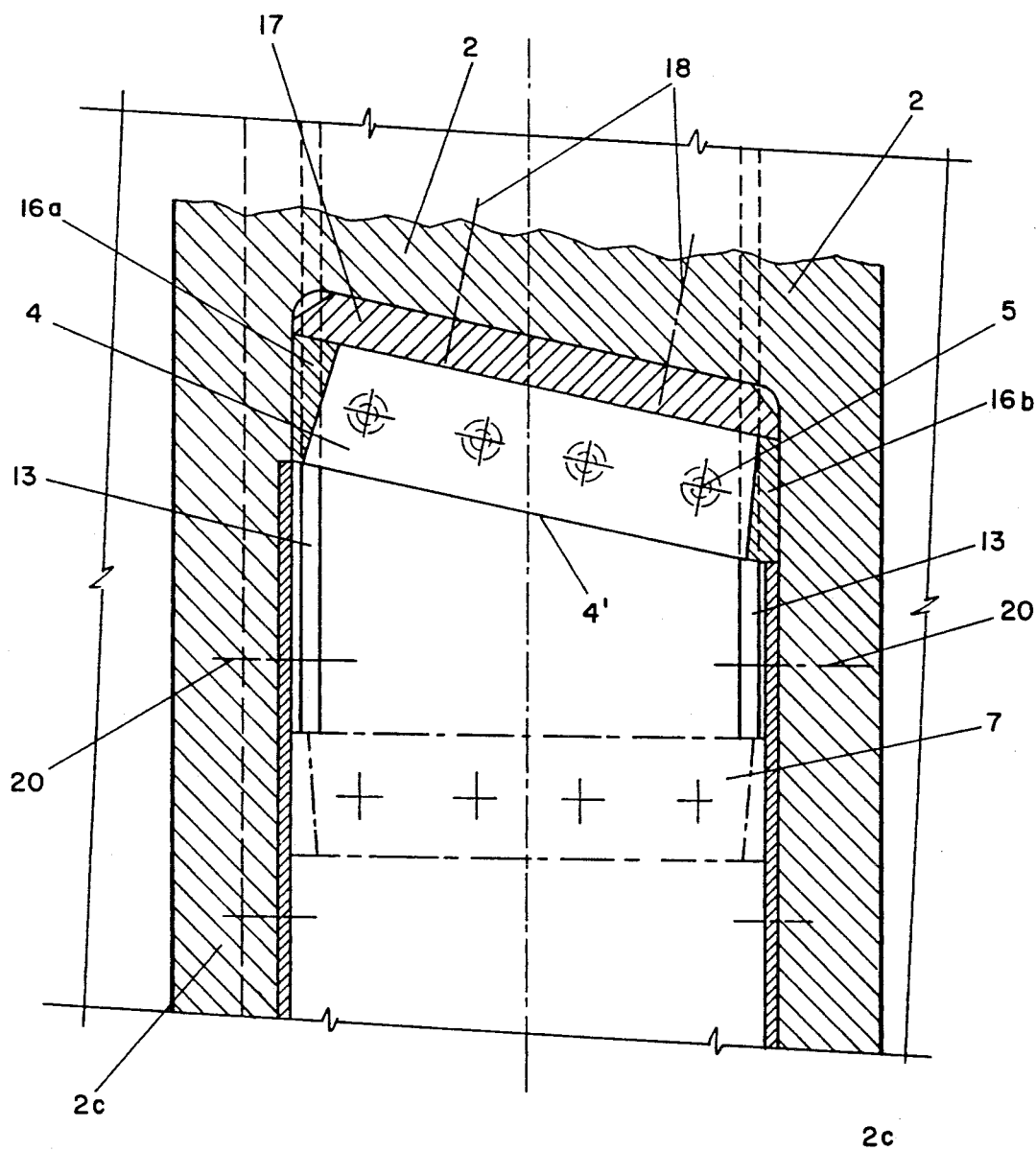
FIG. 5 is an end view of the blade holding device at the blade slide with a one-piece slanted blade.
Figure 6:
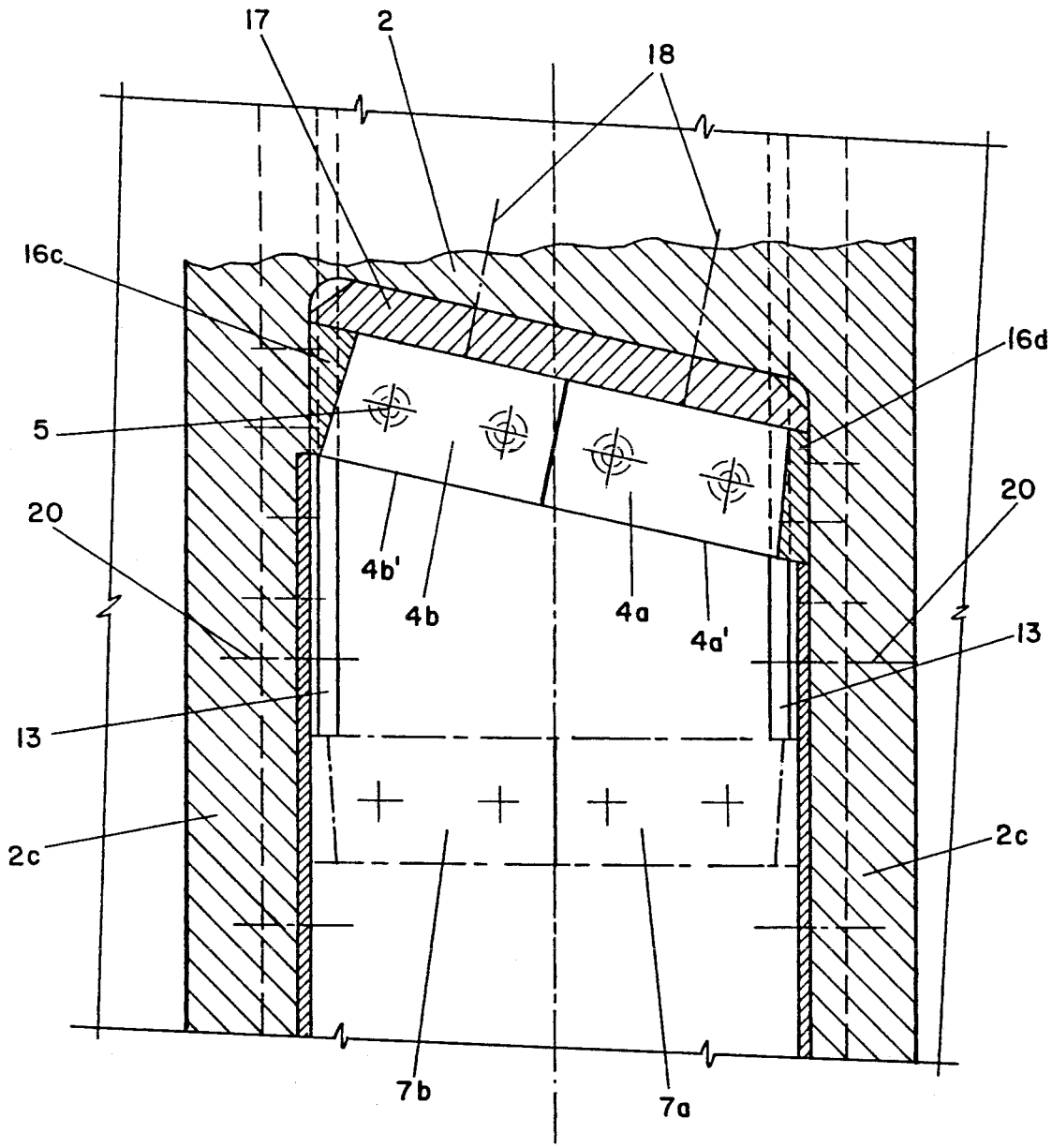
FIG. 6 is an end view of the blade holding device at the blade slide with a two-piece slanted blade.

The lower blades 7 or blade sections 7a, 7b are formed in a trapezoidal shape corresponding to their respective upper blades 4 or blade sections 4a, 4b (cf. FIGS. 5, 6). Thereby identical components are provided in order to simplify the supply and the stock maintenance.

The present invention is, of course, in no way restricted to the specific disclosure of the specification, examples and drawings, but also encompasses any modifications within the scope of the appended claims.

What I claim is:

1. In a blade holding device of a blade slide for a scrap cutter in which a slanted blade is fastened in a cutout of a blade slide with blade securing screws and blade securing nut means, and is secured against sliding in a vertical blade contact surface of said blade slide in a form-locking manner with sleeves that are concentrically arranged about a shaft of said blade securing screws, the improvement wherein:

a first end of said sleeve extends into a recess of a rearward abutting surface of said blade and a second end of said sleeve extends into throughbores of said blade slide, which throughbores extend from said blade contact surface of said blade slide to a second recess at a backside of said blade slide which second recess has a contact surface on which said blade securing nut means rests, and with said sleeve, during demounting of said blade, after removal of said nut means and said screws in a longitudinal direction of a feed channel, being slid toward said backside of said blade slide until said first end of said sleeve is outside said recess of said rearward abutting surface of said blade so that form-locking between said blade and said blade slide is canceled.

2. A blade holding device according to claim 1, in which between said blade and said blade slide a blade support is provided which is fastened to said blade slide and is equipped with throughholes for receiving said sleeve.

3. A blade holding device according to claim 2, in which said sleeve comprises a first short sleeve and a second long spacing sleeve, with said short sleeve being disposed in said recess of said abutting surface of said blade and partially in said throughhole of said blade support, thereby form-locking said blade and said blade support with said second long spacing sleeve extending from said throughhole of said blade support into said throughbore of said blade slide, and with, in an operational position of said scrap cutter, a face of said short sleeve, which face is facing said blade slide, resting against a further face of said long spacing sleeve, which further face is facing said blade.

4. A blade holding device according to claim 2, in which said blade, in a direction parallel to a shearing plane, is in the form of a trapezoid with a longer one of parallel sides of said trapezoid facing downward.

5. A blade holding device according to claim 4, in which between outward ends of said blade and cross-pieces of said blade slide wedge-shaped pieces are disposed, which are fastened to said cross-pieces.

6. A blade holding device according to claim 2, in which said blade is split in a longitudinal direction thereof, having a first and a second blade section, each being in the form of a trapezoid and arranged adjacent to one another, with a longer one of parallel sides of said respective trapezoid of said first blade section that is first in a direction of shearing, facing downward and with a shorter one of parallel sides of said respective trapezoid of said second blade section that is second in said direction of shearing facing downward.

7. A blade holding device according to claim 6, in which between outward ends of said blade and cross-pieces of said blade slide wedge-shaped pieces are disposed, which are fastened to said cross-pieces.

* * * * *